United States Patent
Fleming et al.

(10) Patent No.: US 12,194,574 B2
(45) Date of Patent: Jan. 14, 2025

(54) SYSTEM AND METHOD FOR ADAPTING BREAK POINT FOR SHORT CIRCUIT WELDING

(71) Applicant: Lincoln Global, Inc., Santa Fe Springs, CA (US)

(72) Inventors: Daniel P. Fleming, Painesville, OH (US); Judah B. Henry, Painesville, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 805 days.

(21) Appl. No.: 17/465,352

(22) Filed: Sep. 2, 2021

(65) Prior Publication Data

US 2023/0066991 A1 Mar. 2, 2023

(51) Int. Cl.
*B23K 9/09* (2006.01)
*B23K 9/073* (2006.01)
*B23K 9/095* (2006.01)

(52) U.S. Cl.
CPC .............. *B23K 9/092* (2013.01); *B23K 9/073* (2013.01); *B23K 9/0953* (2013.01)

(58) Field of Classification Search
CPC ....... B23K 9/0953; B23K 9/073; B23K 9/092
See application file for complete search history.

(56) References Cited

U.S. PATENT DOCUMENTS

| | | |
|---|---|---|
| 5,001,326 A | 3/1991 | Stava |
| 7,109,439 B2 | 9/2006 | Stava |
| 8,969,764 B2 | 3/2015 | Peters |
| 9,035,218 B2 | 5/2015 | Artelsmair |
| 9,120,172 B2 | 9/2015 | Dodge et al. |
| 2009/0127242 A1 | 5/2009 | Aimi et al. |
| 2013/0264323 A1 | 10/2013 | Daniel |
| 2015/0283638 A1 | 10/2015 | Henry et al. |
| 2016/0288235 A1 | 10/2016 | Davidson et al. |
| 2020/0316704 A1 | 10/2020 | Durik et al. |

*Primary Examiner* — Robert G Bachner
(74) *Attorney, Agent, or Firm* — David J. Muzilla

(57) ABSTRACT

A system and method generates a short circuit arc welding waveform output, having a pinch phase with a break point and a necking threshold, between a welding electrode and a work piece during a short circuit arc welding process. A necking threshold energy and a break point energy of the short circuit arc welding waveform output are monitored during the short circuit arc welding process, and a running average of the necking threshold energy is generated. An actual pinch energy relationship value is calculated based on the running average of the necking threshold energy and the break point energy, and is compared to a previously specified pinch energy relationship value. The break point energy of the short circuit arc welding waveform output is adjusted in response to the comparison to maintain the actual pinch energy relationship value to be at the specified pinch energy relationship value.

20 Claims, 5 Drawing Sheets

SYSTEM AND METHOD FOR ADAPTING BREAK POINT FOR SHORT CIRCUIT WELDING

CROSS REFERENCE TO RELATED APPLICATIONS/INCORPORATION BY REFERENCE

U.S. Pat. No. 5,001,326, issued on Mar. 19, 1991, is incorporated herein by reference in its entirety. U.S. Pat. No. 9,120,172, issued on Sep. 1, 2015, is incorporated herein by reference in its entirety. U.S. Pat. No. 8,969,764, issued on Mar. 3, 2015, is incorporated herein by reference in its entirety.

FIELD

Embodiments of the present invention relate to arc welding. More specifically, embodiments of the present invention relate to short circuit arc welding and providing consistent stability as welding parameters are changing mid-weld.

BACKGROUND

The stability of short circuit (or modified short circuit) welding relies on applying adequate pinch energy to detect a necking threshold and establish a rhythm with the weld puddle. The ideal amount of pinch energy required for stability will vary as welding variables change such as, for example, contact tip to work distance (CTWD), push angle, travel angle, weld joint, and welding position. Referencing U.S. Pat. No. 5,001,326, a surface tension transfer (STT) pinch current (a break point current) is determined by approximately 60% of current at which electrode necking is detected. Other prior implementations used a fixed break point or relied on adaptive control of arc length to modify break point energy, which did not always result in good stability. Therefore, a more robust approach is needed to provide better stability.

SUMMARY

In one embodiment, an adaptive control for short circuit welding monitors a necking threshold energy and then calculates a relationship (e.g., a ratio or a percentage) to break point energy resulting in, for example, a pinch energy relationship (e.g., a ratio or a percentage). The ratio or percentage is calculated using a rolling average of necking threshold energy data points. A controller alters the break point energy to maintain a defined pinch energy relationship (e.g., ratio or percentage).

In one embodiment, a method of short circuit arc welding used in an arc welding system is provided. The method includes generating a short circuit arc welding waveform output, having a pinch phase with a break point and a necking threshold, between a welding electrode and a work piece during a short circuit arc welding process. The method further includes monitoring a necking threshold energy of the short circuit arc welding waveform output during the short circuit arc welding process and generating a running average of the necking threshold energy. The method also includes monitoring a break point energy of the short circuit arc welding waveform output during the short circuit arc welding process. The method further includes calculating an actual pinch energy relationship value based on the running average of the necking threshold energy and the break point energy, and comparing the actual pinch energy relationship value to a previously specified pinch energy relationship value. The method also includes adjusting the break point energy of the short circuit arc welding waveform output in response to the comparing to maintain the actual pinch energy relationship value to be at the specified pinch energy relationship value. The necking threshold energy corresponds to an energy at the necking threshold in the pinch phase where a premonition of a short exit is detected, indicating that a molten metal ball is about to pinch off from a tip of the welding electrode and enter a weld puddle on the work piece. The break point energy corresponds to an energy at the break point in the pinch phase where a current of the short circuit arc welding output is transitioned from a first steep slope to a second gradual slope. In one embodiment, the actual pinch energy relationship value is calculated as a ratio of the running average of the necking threshold energy and the break point energy. In one embodiment, the actual pinch energy relationship value is calculated as a percentage from the running average of the necking threshold energy and the break point energy. In one embodiment, the actual pinch energy relationship value is calculated as a difference between the running average of the necking threshold energy and the break point energy. In one embodiment, the actual pinch energy relationship value is calculated as a difference between the running average of the necking threshold energy and the break point energy, normalized to the running average of the necking threshold energy. In one embodiment, the method includes determining the necking threshold energy from at least one of a current and a voltage of the short circuit arc welding waveform output at the necking threshold. In one embodiment, the method includes determining the break point energy from at least one of a current and a voltage of the short circuit arc welding waveform output at the break point. In one embodiment, the method includes storing the specified pinch energy relationship value in a weld table.

In one embodiment, a short circuit arc welding system is provided. The system includes a power conversion circuit configured to produce a welding output power between a welding electrode and a work piece, and a waveform generator operatively connected to the power conversion circuit and configured to generate a short circuit arc welding waveform to modulate the welding output power to produce a short circuit arc welding waveform output. The system also includes a voltage feedback circuit configured to monitor a welding output voltage between the welding electrode and the work piece, and a current feedback circuit configured to monitor a welding output current between the welding electrode and the work piece. The system further includes a controller operatively connected to the power conversion circuit, the waveform generator, the voltage feedback circuit, and the current feedback circuit. The controller is configured to receive the welding output voltage and the welding output current and control the waveform generator and the power conversion circuit. Under the control of the controller, the short circuit arc welding waveform output is generated, having a pinch phase with a break point and a necking threshold, between the welding electrode and the work piece during a short circuit arc welding process. Furthermore, under the control of the controller, a necking threshold energy of the short circuit arc welding waveform output is monitored during the short circuit arc welding process and a running average of the necking threshold energy is generated. Also, a break point energy of the short circuit arc welding waveform output is monitored during the short circuit arc welding process. Under the control of the controller, an actual pinch energy relationship value is calculated based on the running average of the necking threshold energy and the break point energy, and the actual pinch energy relationship value is compared to a previously specified pinch energy relationship value. Also, under the control of the controller, the break point energy of the short circuit arc welding waveform output is adjusted in response to the comparing to maintain the actual pinch energy relationship value to be at the specified pinch energy relationship value. The necking threshold energy corresponds to an energy at the necking threshold in the pinch phase where a premonition of a short exit is detected, indicating that a molten metal ball is about to pinch off from a tip of the welding electrode and enter a weld puddle on the work piece. The break point energy corresponds to an energy at the break point in the pinch phase where a current of the short circuit arc welding output is transitioned from a first steep slope to a second gradual slope. In one embodiment, the controller calculates the actual pinch energy relationship value as a ratio of the running average of the necking threshold energy and the break point energy. In one embodiment, the controller calculates the actual pinch energy relationship value as a percentage from the running average of the necking threshold energy and the break point energy. In one embodiment, the controller calculates the actual pinch energy relationship value as a difference between the running average of the necking threshold energy and the break point energy. In one embodiment, the controller calculates the actual pinch energy relationship value as a difference between the running average of the necking threshold energy and the break point energy, normalized to the running average of the necking threshold energy. In one embodiment, the controller determines the necking threshold energy from at least one of the welding output current and the welding output voltage of the short circuit arc welding waveform output at the necking threshold. In one embodiment, the controller determines the break point energy from at least one of the welding output current and the welding output voltage of the short circuit arc welding waveform output at the break point. In one embodiment, the specified pinch energy relationship value is stored in a memory of the controller.

Numerous aspects of the general inventive concepts will become readily apparent from the following detailed description of exemplary embodiments, from the claims, and from the accompanying drawings.

BRIEF DESCRIPTION OF THE DRAWINGS

The accompanying drawings, which are incorporated in and constitute a part of the specification, illustrate various embodiments of the disclosure. It will be appreciated that the illustrated element boundaries (e.g., boxes, groups of boxes, or other shapes) in the figures represent one embodiment of boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
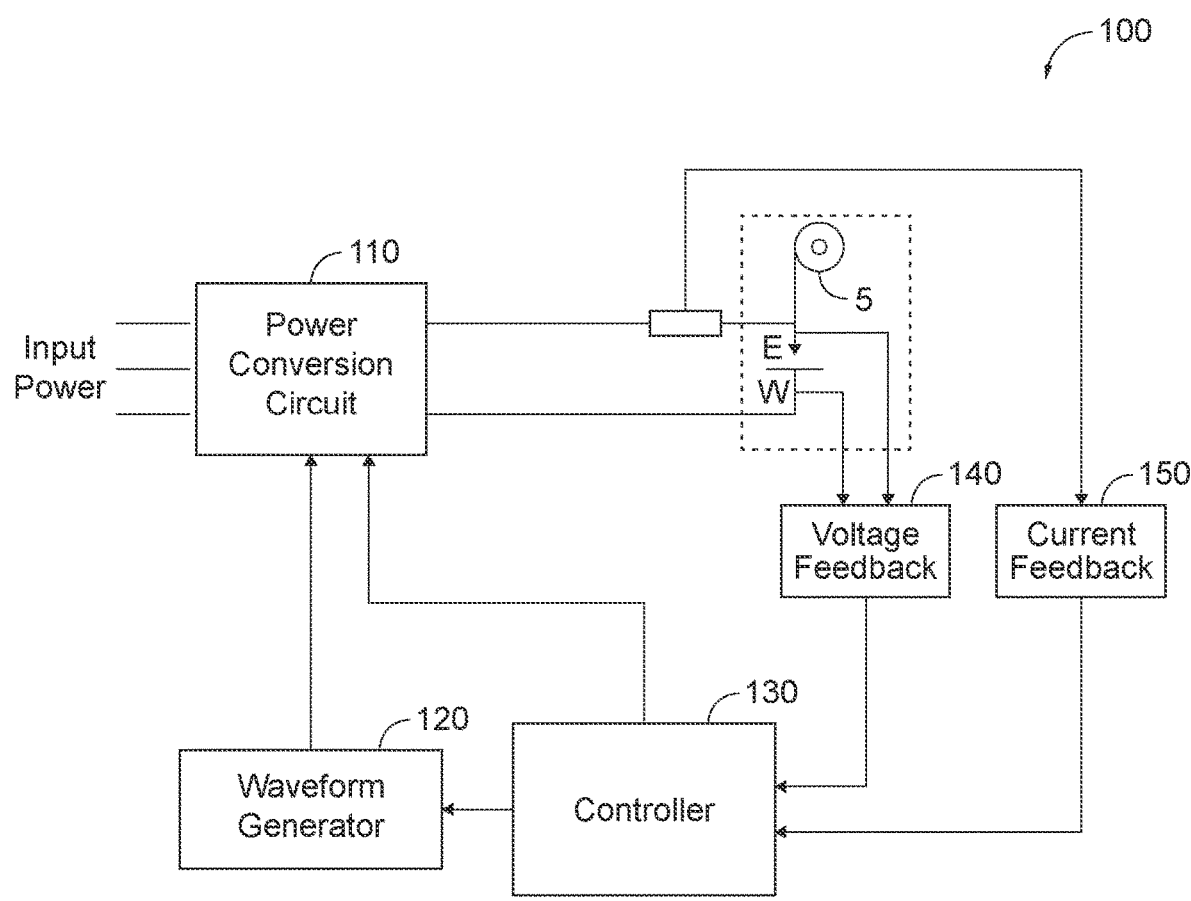
FIG. 1 illustrates a block diagram of one embodiment of an arc welding system configured to provide a short circuit arc welding process having improved performance stability.

The examples and figures herein are illustrative only and are not meant to limit the subject invention, which is measured by the scope and spirit of the claims. Referring now to the drawings, wherein the showings are for the purpose of illustrating exemplary embodiments of the subject invention only and not for the purpose of limiting same, FIG. 1 illustrates a block diagram of one embodiment of an arc welding system 100 configured to provide a short circuit arc welding process having improved performance stability.

The welding system 100 includes a power conversion circuit 110 providing welding output power between a welding electrode E and a work piece W. The power conversion circuit 110 may be transformer based with a bridge output topology (e.g. a half bridge output topology). For example, the power conversion circuit 110 may be of an inverter type that includes an input power side and an output power side as delineated by the primary and secondary sides, respectively, of a welding transformer. Other types of power conversion circuits are possible as well such as, for example, a chopper type have a DC output topology. A wire feeder 5 feeds the consumable wire welding electrode E toward the work piece W. The wire feeder 5, the consumable welding electrode E, and the work piece W can be considered to be a part of the welding system 100 and are operatively connected to other parts of the system 100 via, for example, welding output cables.

The welding system 100 also includes a waveform generator 120 and a controller 130. The waveform generator 120 generates welding waveforms (e.g., a short circuit welding waveform) at the command of the controller 130. A waveform generated by the waveform generator 120 modulates the output of the power conversion circuit 110 to produce the welding output current between the electrode E and the work piece W. The welding system 100 also includes a voltage feedback circuit 140 and a current feedback circuit 150 to monitor the welding output voltage and current between the electrode E and the work piece W and provide the monitored voltage and current back to the controller 130. The feedback voltage and current may be used by the controller 130 to make decisions with respect to modifying the welding waveform generated by the waveform generator 120 and/or to make other decisions that affect safe operation of the welding system 100. For example, the controller 130 may use the feedback voltage and/or the feedback current to determine when a short of the electrode E to the work piece W has occurred, and when a molten metal ball on the tip of the electrode E is about to pinch off from the tip of the electrode E and into a weld puddle (pool) on the work piece W.

Figure 4:
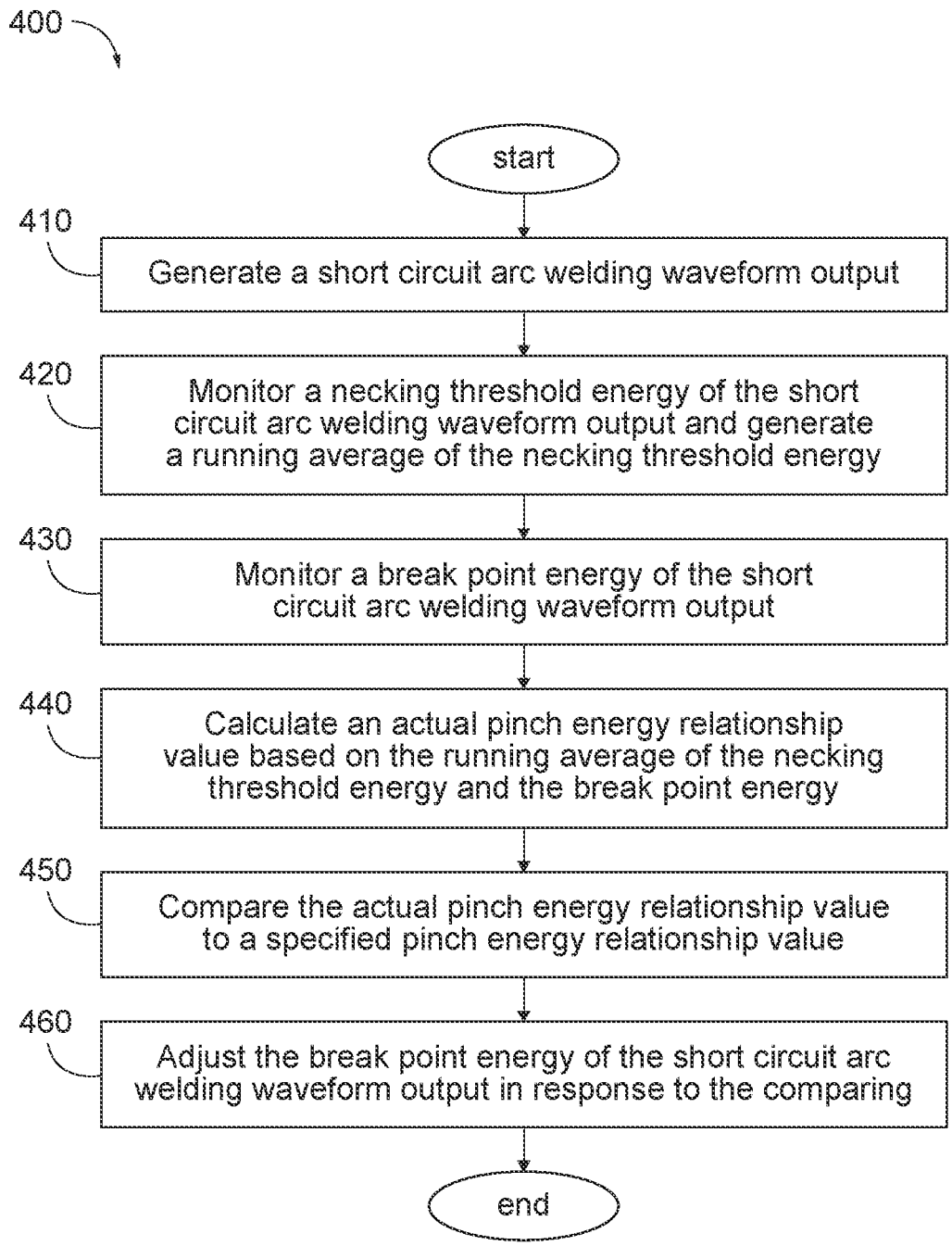
FIG. 4 illustrates a flow chart of one embodiment of a method for providing improved stability in a short circuit welding process by dynamically adjusting a break point (BP) during welding.

FIG. 4 of U.S. Pat. No. 5,001,326, which is incorporated herein by reference, is referred to, in order to establish some definitions. Referring to FIG. 4 of U.S. Pat. No. 5,001,326, a short circuit welding waveform is shown. The short circuit welding waveform could be produced by the arc welding system 100 of FIG. 1 herein. The waveform includes (with respect to welding output current) a background phase, a pinch phase, a peak phase, and a tail-out phase. In between the background phase and the pinch phase is a first low current transition section. Also, in between the pinch phase and the peak phase is a second low current transition section. During a welding operation using the waveform of FIG. 4 of U.S. Pat. No. 5,001,326 (e.g., as produced by the welding system 100 of FIG. 1 herein), a molten metal ball is produced at the tip of the welding electrode E during the background phase. During the first low current transition section, the molten metal ball shorts to the work piece W and the current is reduced, allowing the molten metal ball to wet into the weld puddle on the work piece W. During the pinch phase, a dual ramp pinch current is applied to the short to help the molten metal ball pinch off from the end of the electrode E into the weld puddle on the work piece W. There is a break point (BP) between the dual ramps of current of the pinch phase and there is a necking threshold current level near the end of the pinch phase, as discussed later herein. During the second low current transition section, the current is reduced, allowing a welding arc to easily re-establish between the electrode E and the work piece W after the molten metal ball has pinched off from the electrode E, clearing the short. During the peak phase, peak current is applied to set the proper arc length of the re-established arc and to begin melting a new molten metal ball from the tip of the electrode E. During the tail-out phase, generated heat is controlled by controlling the rate at which the current transitions from a peak current level to a background current level of the next background phase. The waveform repeats during the welding process to form a weld.

Referring again to FIG. 4 of U.S. Pat. No. 5,001,326, the term "pinch phase", as used herein, refers to the portion of a short circuit arc welding waveform where a "pinch pulse" (PP) welding output current is produced. The pinch phase is entered when a molten metal ball on the tip of a welding electrode first shorts to a work piece, and ends when the molten metal ball pinches off from the tip of the welding electrode and enters the weld puddle (pool). During the pinch phase, the welding current of the PP is controlled to initially ramp (e.g., upwards) at a first rate (having a first steep slope) towards a break point (BP), as seen in FIG. 4 of U.S. Pat. No. 5,001,326. Once the break point (BP) is reached, the welding current of the PP is controlled to ramp (e.g., further upwards) at a second rate (having a second gradual slope) where the welding current eventually reaches a necking threshold level (e.g., a peak level of the PP) before dropping, as seen in FIG. 4 of U.S. Pat. No. 5,001,326.

Therefore, the break point (BP) is that point during the pinch phase where the welding current is transitioned from the first steep slope to the second gradual slope. At the break point (BP), the welding output is said to be at a BP welding current level or a BP welding energy level (e.g., a surface tension transfer (STT) pinch current level). For example, an STT switch may be part of the power conversion circuit 110 to help effect the break point. The necking threshold is the point where a short exit detection is triggered (a premonition of a short exit), indicating that the molten metal ball is about to pinch off from the tip of the welding electrode and enter the weld puddle (pool). At the necking threshold, the welding output is said to be at a necking threshold current level (or a necking threshold energy level).

The term "energy" is used broadly herein (e.g., when referring to a value of necking threshold, a value of break point, and values of certain pinch calculations using same). To the extent that energy is proportional to current and power (where an increase in current can correspond to an increase in energy or power, and where a decrease in current can correspond to a decrease in energy or power), the term "energy" may refer to energy, current, or power. Also, standard units of energy and/or current and/or power do not necessarily have to be used with respect to all aspects of certain embodiments of the present invention, as long as a relative consistency is maintained. For example, a scaled version of current (amps) may be used to represent power or energy. What matters are the relationships of the parameter values (e.g., necking threshold value, break point value, actual pinch value, specified pinch value) with respect to each other, as discussed in more detail later herein.

In accordance with one embodiment, the controller 130 of the arc welding system 100 monitors and stores a necking threshold energy in the form of data points. The stored necking threshold energy is put through a rolling average of previous short circuit energy captures and is then used to determine a relationship with respect to a break point (BP) energy to form a pinch energy relationship (e.g., as a ratio or a percentage). A value of the real time (actual) pinch energy relationship is compared to a previously specified and desired pinch energy relationship value stored in a weld table (e.g., in a memory of the controller 130). Based on the result of the comparison, the break point (BP) energy is adjusted to drive the pinch energy relationship to the desired value. This provides consistent stability for the short circuit welding process, even while welding parameters are changing during the welding process.

Figure 2:
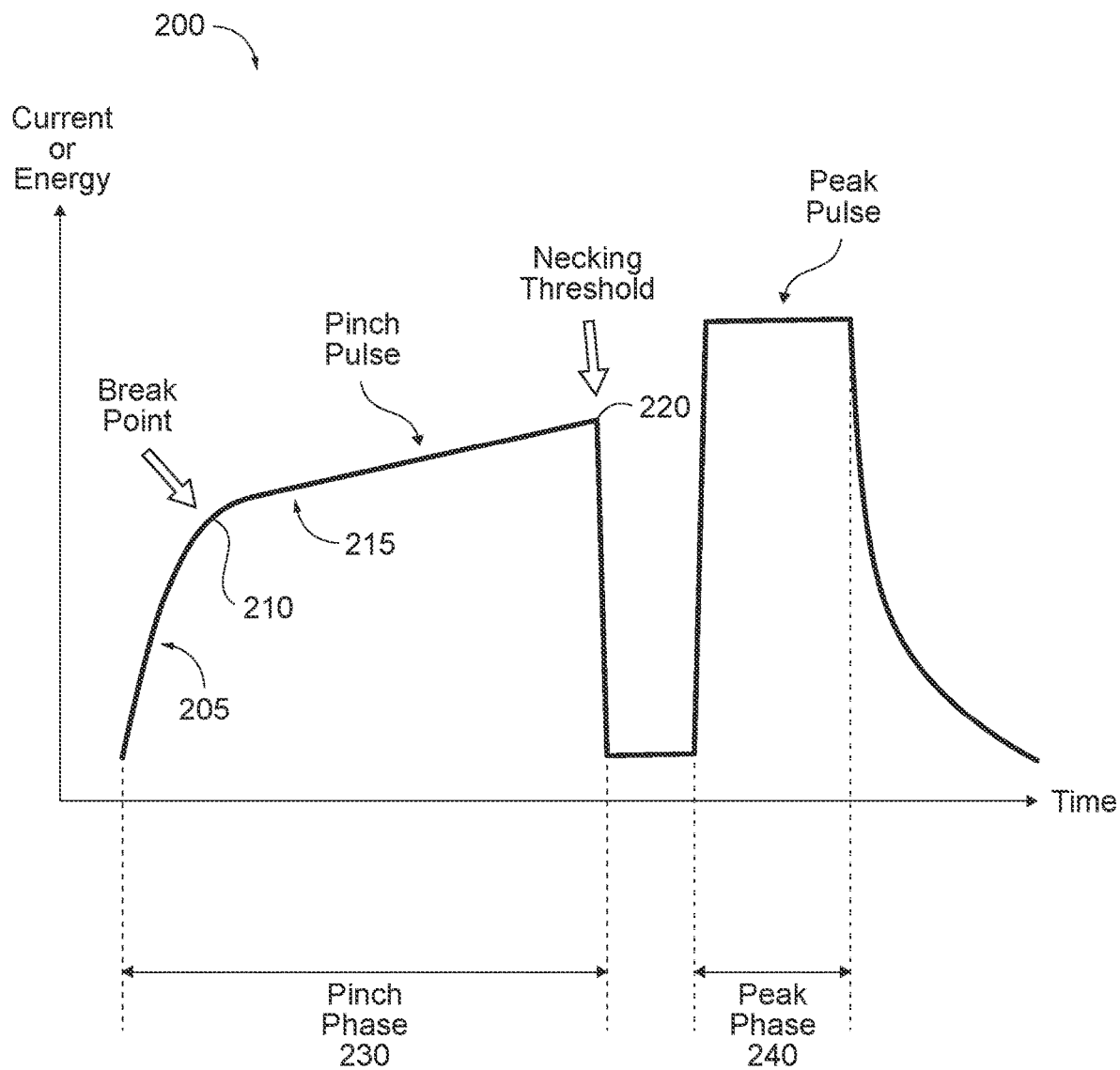
FIG. 2 illustrates one embodiment of a portion of a short circuit arc welding waveform, produced by the system of FIG. 1 for the short circuit arc welding process, showing a break point (BP) and a necking threshold.

FIG. 2 illustrates one embodiment of a portion of a short circuit arc welding waveform 200, produced by the system 100 of FIG. 1 for the short circuit welding process, showing a break point 210 and a necking threshold 220. The BP 210 and the necking threshold 220 are each points on the pinch pulse within the pinch phase 230. The pinch phase 230 has a first steep slope portion 205 (a first ramp) and a second gradual slope portion 215 (a second ramp) as seen in FIG. 2. A peak pulse, occurring during a peak phase 240 after the pinch pulse, is also shown. In accordance with one embodiment of the present invention, it is the break point 210 which is automatically and dynamically adjusted upwards or downwards (corresponding to a break point energy being automatically adjusted upwards or downwards) to maintain the actual pinch energy to be at a specified pinch energy. In accordance with one embodiment, the necking threshold energy is determined from at least one of the welding current and the welding voltage of the short circuit arc welding waveform output at the necking threshold, and the break point energy is determined from at least one of the welding current and the welding voltage of the short circuit arc welding waveform output at the break point (e.g., as monitored by the voltage feedback circuit 140 and/or the current feedback circuit 150).

The actual pinch energy is expressed as a pinch energy relationship value, and the specified pinch energy is expressed as a specified pinch energy relationship value. The relationship is between the necking threshold energy and the break point energy. In accordance with one embodiment, the pinch energy relationship value is calculated (e.g., by the controller 130) as a ratio of the running average (RA) of the necking threshold energy and the break point energy, as follows:

Pinch Energy=$RA$ Necking Threshold Energy/Break Point Energy.

In accordance with one embodiment, the pinch energy relationship value is calculated (e.g., by the controller 130) as a percentage from the running average of the necking threshold energy and the break point energy, as follows:

Pinch Energy (%)=(RA Necking Threshold Energy/Break Point Energy)×100 or

Pinch Energy (%)=(Break Point Energy/RA Necking Threshold Energy)×100.

In accordance with one embodiment, the pinch energy relationship value is calculated (e.g., by the controller 130) as a difference between the running average of the necking threshold energy and the break point energy, as follows:

Pinch Energy=RA Necking Threshold Energy−Break Point Energy.

In accordance with one embodiment, the pinch energy relationship value is calculated (e.g., by the controller 130) as a difference between the running average of the necking threshold energy and the break point energy, normalized to the running average of the necking threshold energy, as follows:

Pinch Energy=(RA Necking Threshold Energy−Break Point Energy)/RA Necking Threshold Energy.

In accordance with one embodiment, the pinch energy relationship value is calculated (e.g., by the controller 130) as a difference between the running average of the necking threshold energy and the break point energy, normalized to the break point energy, as follows:

Pinch Energy=(RA Necking Threshold Energy−Break Point Energy)/Break Point Energy.

Other ways of calculating a Pinch Relationship Energy (using a RA Necking Threshold Energy and a Break Point Energy) are possible as well, in accordance with other embodiments. Furthermore, in one embodiment, instead of a running average, a sliding window average of necking threshold values (e.g., energy values) over N samples may be used instead (N being a positive integer). Other types of averages of necking threshold values (and/or break point values) may be used, in accordance with other embodiments.

Again, the term "energy" is used broadly herein (e.g., when referring to a value of necking threshold, a value of break point, and values of certain pinch calculations using same). To the extent that energy is proportional to current and power (where an increase in current can correspond to an increase in energy or power, and where a decrease in current can correspond to a decrease in energy or power), the term "energy" may refer to energy, current, or power. Also, standard units of energy and/or current and/or power do not necessarily have to be used with respect to all aspects of certain embodiments of the present invention, as long as a relative consistency is maintained. For example, a normalized version of watts (amps×volts) may be used to represent power or energy. What matters are the relationships of the parameter values (e.g., necking threshold value, break point value, actual pinch value, specified pinch value) with respect to each other.

Figure 3:
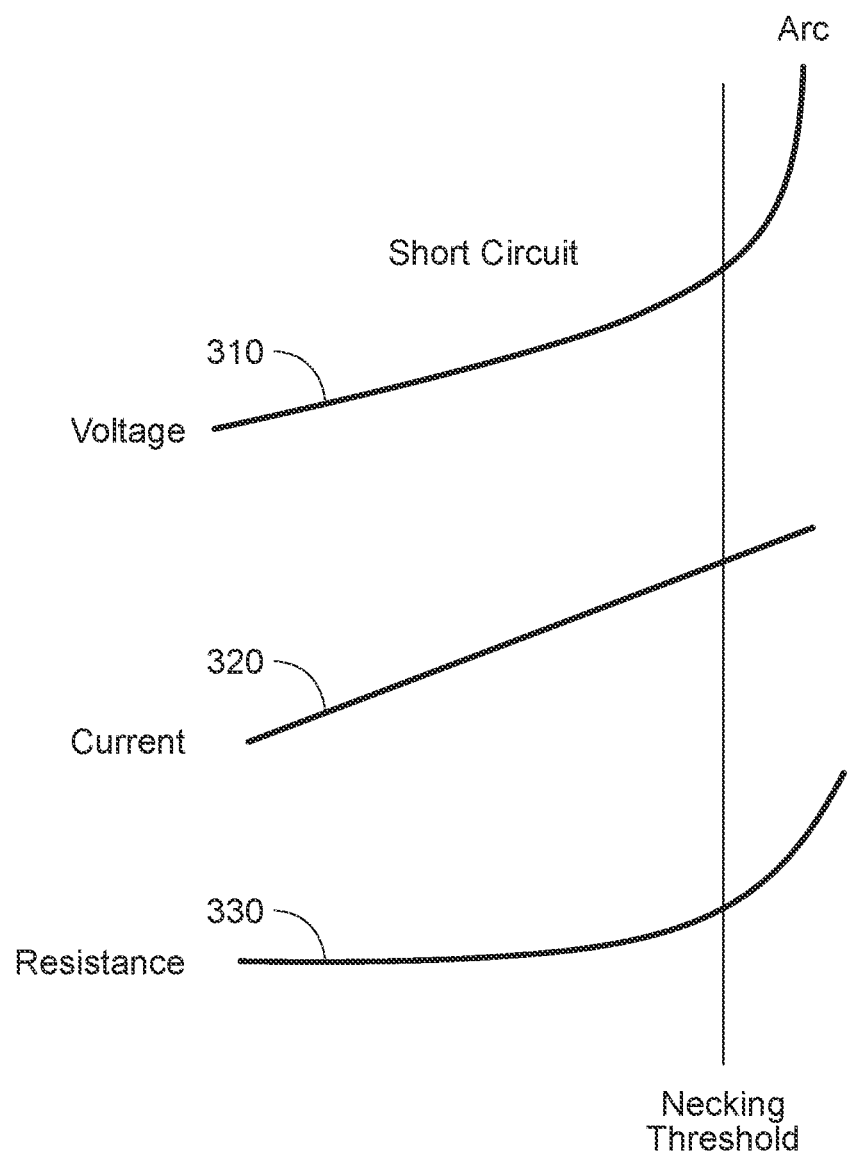
FIG. 3 illustrates how a welding output voltage, a welding output current, and a welding output resistance behave near a necking threshold of a short circuit welding waveform output, in accordance with one embodiment.

FIG. 3 illustrates how a welding output voltage 310, a welding output current 320, and a welding output resistance 330 behave near the necking threshold of the short circuit welding waveform output, in accordance with one embodiment. A short exists between the welding electrode and the work piece just before the necking threshold. Just after the necking threshold, the short is exited or cleared and an arc is re-established between the welding electrode and the work piece.

FIG. 4 illustrates a flow chart of one embodiment of a method 400 for providing improved stability in a short circuit arc welding process by dynamically adjusting a break point (BP) during welding. In block 410 of the method 400, a short circuit arc welding waveform output, having a pinch phase with a break point and a necking threshold, is generated between a welding electrode and a work piece during a short circuit arc welding process. In block 420, a necking threshold energy of the short circuit arc welding waveform output is monitored during the short circuit arc welding process and a running average of the necking threshold energy is generated. Again, the necking threshold energy corresponds to an energy at the necking threshold in the pinch phase where a premonition of a short exit is detected, indicating that a molten metal ball is about to pinch off from a tip of the welding electrode and enter a weld puddle on the work piece. In block 430, a break point energy of the short circuit arc welding waveform output is monitored during the short circuit arc welding process. Again, the break point energy corresponds to an energy at the break point in the pinch phase where a current of the short circuit arc welding output is transitioned from a first steep slope to a second gradual slope. In block 440, an actual pinch energy relationship value is calculated based on the running average of the necking threshold energy and the break point energy. In block 450, the actual pinch energy relationship value is compared to a previously specified pinch energy relationship value. In block 460, the break point energy of the short circuit arc welding waveform output is adjusted in response to the comparing to maintain the actual pinch energy relationship value to be at the specified pinch energy relationship value. In this manner, improved and consistent stability for the short circuit welding process is achieved, even while welding parameters are changing during the welding process.

Figure 5:
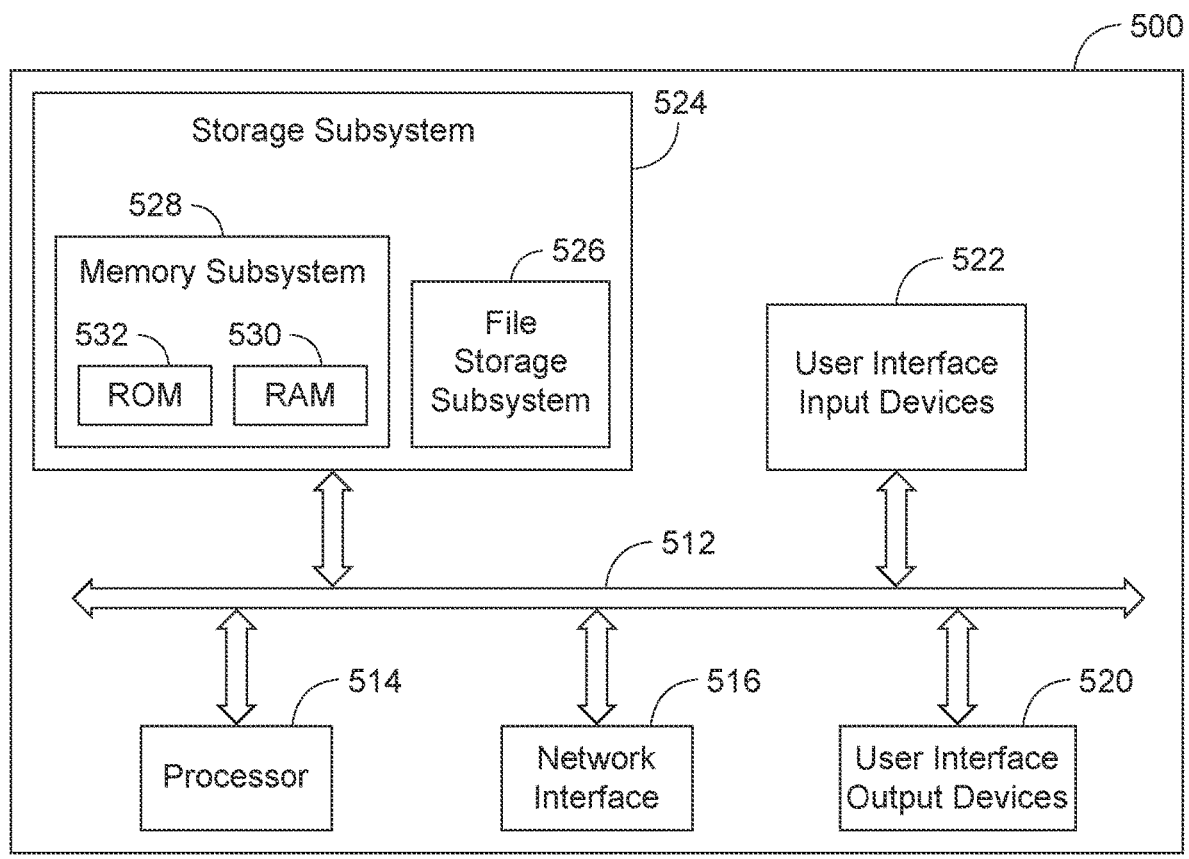
FIG. 5 illustrates a block diagram of an example embodiment of a controller that can be used, for example, in the arc welding system of FIG. 1.

FIG. 5 illustrates a block diagram of an example embodiment of a controller 500 that can be used, for example, as the controller 130 in the arc welding system 100 of FIG. 1. Referring to FIG. 5, the controller 500 includes at least one processor 514 (e.g., a microprocessor, a central processing unit, a graphics processing unit) which communicates with a number of peripheral devices via bus subsystem 512. These peripheral devices may include a storage subsystem 524, including, for example, a memory subsystem 528 and a file storage subsystem 526, user interface input devices 522, user interface output devices 520, and a network interface subsystem 516. The input and output devices allow user interaction with the controller 500. Network interface subsystem 516 provides an interface to outside networks and is coupled to corresponding interface devices in other devices.

User interface input devices 522 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into the controller 500 or onto a communication network.

User interface output devices 520 may include a display subsystem, a printer, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from the controller 500 to the user or to another machine or computer system.

Storage subsystem 524 stores programming and data constructs that provide some or all of the functionality described herein. For example, computer-executable instructions and data are generally executed by processor 514 alone or in combination with other processors. Memory 528 used in the storage subsystem 524 can include a number of memories including a main random access memory (RAM) 530 for storage of instructions and data during program execution and a read only memory (ROM) 532 in which fixed instructions are stored. A file storage subsystem 526 can provide persistent storage for program and data files, and may include a hard disk drive, a solid state drive, a floppy disk drive along with associated removable media, a CD-ROM drive, an optical drive, or removable media cartridges. The computer-executable instructions and data implementing the functionality of certain embodiments may be stored by file storage subsystem 526 in the storage subsystem 524, or in other machines accessible by the processor(s) 514.

Bus subsystem 512 provides a mechanism for letting the various components and subsystems of the controller 500 communicate with each other as intended. Although bus subsystem 512 is shown schematically as a single bus, alternative embodiments of the bus subsystem may use multiple buses.

The controller 500 can be of varying types. Due to the ever-changing nature of computing devices and networks, the description of the controller 500 depicted in FIG. 5 is intended only as a specific example for purposes of illustrating some embodiments. Many other configurations of a controller are possible, having more or fewer components than the controller 500 depicted in FIG. 5.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or illustrative examples shown and described. Thus, this disclosure is intended to embrace alterations, modifications, and variations that fall within the scope of the appended claims, which satisfy the statutory subject matter requirements of 35 U.S.C. § 101. The above description of specific embodiments has been given by way of example. From the disclosure given, those skilled in the art will not only understand the general inventive concepts and attendant advantages, but will also find apparent various changes and modifications to the structures and methods disclosed. It is sought, therefore, to cover all such changes and modifications as fall within the spirit and scope of the general inventive concepts, as defined by the appended claims, and equivalents thereof.

What is claimed is:

1. A method of short circuit arc welding used in an arc welding system, the method comprising:
    generating a short circuit arc welding waveform output, having a pinch phase with a break point and a necking threshold, between a welding electrode and a work piece during a short circuit arc welding process;
    monitoring a necking threshold energy of the short circuit arc welding waveform output during the short circuit arc welding process and generating a running average of the necking threshold energy;
    monitoring a break point energy of the short circuit arc welding waveform output during the short circuit arc welding process;
    calculating an actual pinch energy relationship value based on the running average of the necking threshold energy and the break point energy;
    comparing the actual pinch energy relationship value to a previously specified pinch energy relationship value; and
    adjusting the break point energy of the short circuit arc welding waveform output in response to the comparing to maintain the actual pinch energy relationship value to be at the specified pinch energy relationship value.

2. The method of claim 1, wherein the necking threshold energy corresponds to an energy at the necking threshold in the pinch phase where a premonition of a short exit is detected, indicating that a molten metal ball is about to pinch off from a tip of the welding electrode and enter a weld puddle on the work piece.

3. The method of claim 1, wherein the break point energy corresponds to an energy at the break point in the pinch phase where a current of the short circuit arc welding output is transitioned from a first steep slope to a second gradual slope.

4. The method of claim 1, wherein the actual pinch energy relationship value is calculated as a ratio of the running average of the necking threshold energy and the break point energy.

5. The method of claim 1, wherein the actual pinch energy relationship value is calculated as a percentage from the running average of the necking threshold energy and the break point energy.

6. The method of claim 1, wherein the actual pinch energy relationship value is calculated as a difference between the running average of the necking threshold energy and the break point energy.

7. The method of claim 1, wherein the actual pinch energy relationship value is calculated as a difference between the running average of the necking threshold energy and the break point energy, normalized to the running average of the necking threshold energy.

8. The method of claim 1, further comprising determining the necking threshold energy from at least one of a current and a voltage of the short circuit arc welding waveform output at the necking threshold.

9. The method of claim 1, further comprising determining the break point energy from at least one of a current and a voltage of the short circuit arc welding waveform output at the break point.

10. The method of claim 1, further comprising storing the specified pinch energy relationship value in a weld table.

11. A short circuit arc welding system, the system comprising:
    a power conversion circuit configured to produce a welding output power between a welding electrode and a work piece;
    a waveform generator operatively connected to the power conversion circuit and configured to generate a short circuit arc welding waveform to modulate the welding output power to produce a short circuit arc welding waveform output;

a voltage feedback circuit configured to monitor a welding output voltage between the welding electrode and the work piece;

a current feedback circuit configured to monitor a welding output current between the welding electrode and the work piece;

a controller operatively connected to the power conversion circuit, the waveform generator, the voltage feedback circuit, and the current feedback circuit, wherein the controller is configured to receive the welding output voltage and the welding output current and control the waveform generator and the power conversion circuit to:

generate the short circuit arc welding waveform output, having a pinch phase with a break point and a necking threshold, between the welding electrode and the work piece during a short circuit arc welding process, monitor a necking threshold energy of the short circuit arc welding waveform output during the short circuit arc welding process and generate a running average of the necking threshold energy, monitor a break point energy of the short circuit arc welding waveform output during the short circuit arc welding process, calculate an actual pinch energy relationship value based on the running average of the necking threshold energy and the break point energy, compare the actual pinch energy relationship value to a previously specified pinch energy relationship value, and adjust the break point energy of the short circuit arc welding waveform output in response to the compare to maintain the actual pinch energy relationship value to be at the specified pinch energy relationship value.

12. The system of claim 11, wherein the necking threshold energy corresponds to an energy at the necking threshold in the pinch phase where a premonition of a short exit is detected, indicating that a molten metal ball is about to pinch off from a tip of the welding electrode and enter a weld puddle on the work piece.

13. The system of claim 11, wherein the break point energy corresponds to an energy at the break point in the pinch phase where a current of the short circuit arc welding output is transitioned from a first steep slope to a second gradual slope.

14. The system of claim 11, wherein the controller calculates the actual pinch energy relationship value as a ratio of the running average of the necking threshold energy and the break point energy.

15. The system of claim 11, wherein the controller calculates the actual pinch energy relationship value as a percentage from the running average of the necking threshold energy and the break point energy.

16. The system of claim 11, wherein the controller calculates the actual pinch energy relationship value as a difference between the running average of the necking threshold energy and the break point energy.

17. The system of claim 11, wherein the controller calculates the actual pinch energy relationship value as a difference between the running average of the necking threshold energy and the break point energy, normalized to the running average of the necking threshold energy.

18. The system of claim 11, wherein the controller determines the necking threshold energy from at least one of the welding output current and the welding output voltage of the short circuit arc welding waveform output at the necking threshold.

19. The system of claim 11, wherein the controller determines the break point energy from at least one of the welding output current and the welding output voltage of the short circuit arc welding waveform output at the break point.

20. The system of claim 11, wherein the specified pinch energy relationship value is stored in a memory of the controller.

* * * * *